United States Patent
Izutani et al.

(10) Patent No.: US 8,640,724 B2
(45) Date of Patent: Feb. 4, 2014

(54) VALVE CONTROL SYSTEM AND VALVE CONTROL METHOD

(75) Inventors: Hajime Izutani, Takatsuki (JP); Tsuyoshi Matsumoto, Suita (JP); Fumiharu Shimohara, Kariya (JP)

(73) Assignee: Omron Corporation, Kyoto (JP)

( * ) Notice: Subject to any disclaimer, the term of this patent is extended or adjusted under 35 U.S.C. 154(b) by 432 days.

(21) Appl. No.: 13/022,222

(22) Filed: Feb. 7, 2011

(65) Prior Publication Data

US 2011/0214742 A1    Sep. 8, 2011

(30) Foreign Application Priority Data

Mar. 4, 2010    (JP) ................................. 2010-047931

(51) Int. Cl.
*F16K 31/02* (2006.01)
(52) U.S. Cl.
USPC .................. 137/1; 137/624.11; 137/487.5
(58) Field of Classification Search
USPC ............. 137/624.11, 624.12, 487.5, 1, 12, 14
See application file for complete search history.

(56) References Cited

U.S. PATENT DOCUMENTS

| | | | | |
|---|---|---|---|---|
| 5,269,341 A * | 12/1993 | Nusz et al. | ...................... | 137/12 |
| 5,954,089 A * | 9/1999 | Seymour | ...................... | 137/613 |
| 6,543,479 B2 * | 4/2003 | Coffey et al. | ............ | 137/624.11 |
| 7,335,396 B2 * | 2/2008 | Carpenter et al. | ......... | 137/487.5 |
| 8,020,585 B2 * | 9/2011 | Shock et al. | .................. | 137/613 |
| 8,109,289 B2 * | 2/2012 | Trnka et al. | ................ | 137/487.5 |
| 2008/0082184 A1 | 4/2008 | Murakami | | |

FOREIGN PATENT DOCUMENTS

| | | |
|---|---|---|
| EP | 0952505 | 10/1999 |
| JP | 58-040629 | 3/1983 |
| JP | 01-220788 | 9/1989 |
| JP | 2008-040998 | 2/2008 |
| WO | 2006/014508 | 2/2006 |

OTHER PUBLICATIONS

Search report from E.P.O., mail date is Feb. 3, 2012.
"Safety engineering guidelines", FESTO; see p. 62, "ISO valves in accordance with 5599-1 with position sensing of the piston spool", Jun. 2009.

* cited by examiner

*Primary Examiner* — Kevin Lee
(74) *Attorney, Agent, or Firm* — Greenblum & Bernstein, P.L.C.

(57) ABSTRACT

A valve control system includes general-purpose valves arranged in a pipe that allows the flow of fluid, first and second sensors, and a safety controller. The general-purpose valves are valves that can be opened and closed according to electric signals, and may be, e.g., solenoid valves, respectively. The first and second sensors are sensors that detect a state of fluid flowing from the corresponding valves, and are formed of, e.g., pressure switches, respectively. The safety controller may satisfy safety standards, and outputs signals for controlling the valves based on signals provided from the first and second sensors, respectively.

13 Claims, 12 Drawing Sheets

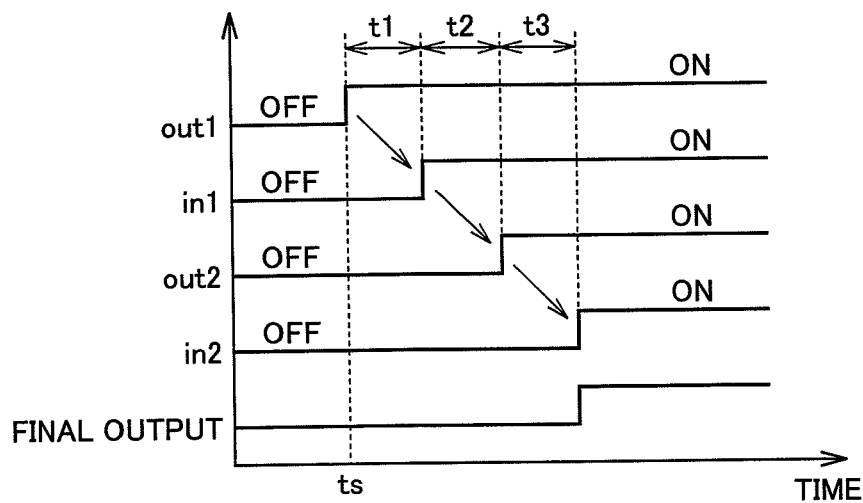
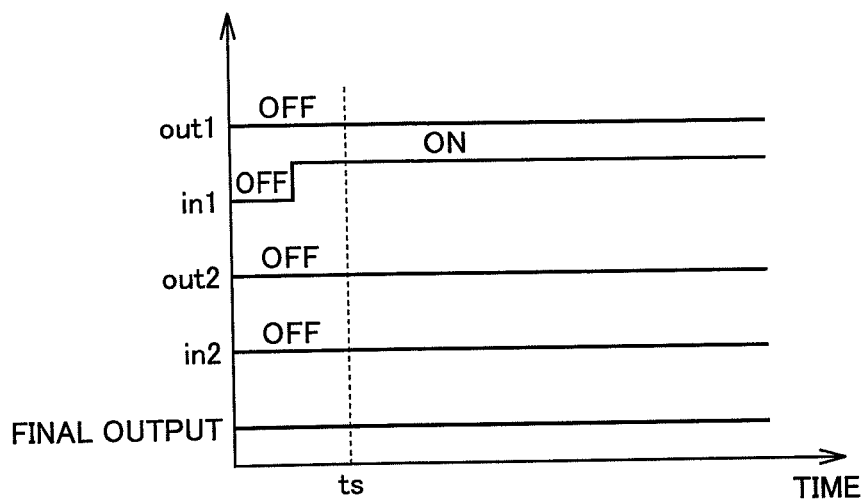

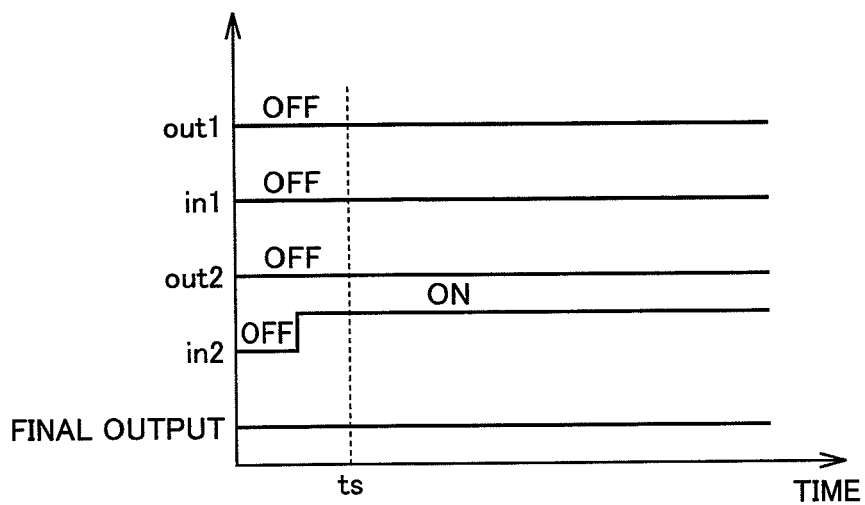
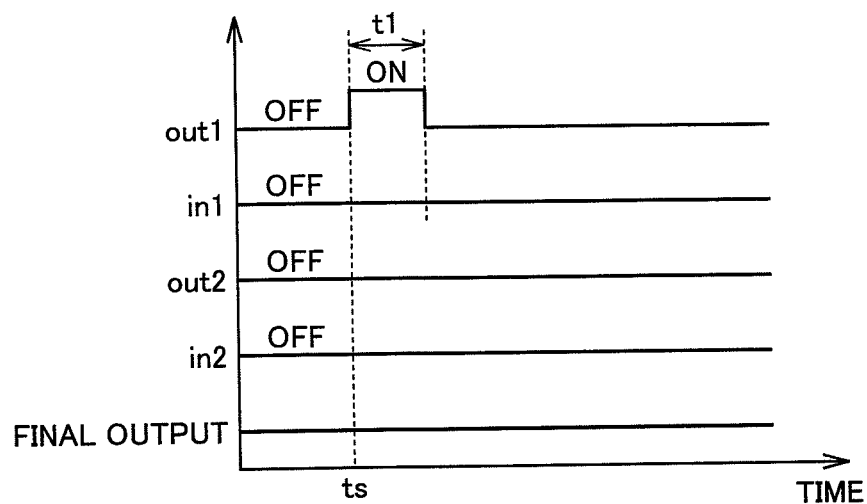

FIG. 16 PRIOR ART

LOW → HIGH

| CATEGORY | SUMMARY OF REQUIREMENTS | BEHAVIOR OF SYSTEM | BASIS FOR ENSURING SAFETY | MTTF$_d$ OF EACH CHANNEL | DC$_{avg}$ | CCF |
|---|---|---|---|---|---|---|
| B | DESIGN, SELECTION AND ASSEMBLY ARE PERFORMED ACCORDING TO RELATED STANDARDS FOR ENDURING SERVICE ENVIRONMENT STRESS. BASIC SAFETY PRINCIPLE MUST BE USED. | SAFETY FUNCTION IS LOST WHEN FAULT OCCURS. | PRIMARILY BY SELECTION OF COMPONENTS | FROM LOW TO MEDIUM | NULL | UNRELATED |
| 1 | IN ADDITION TO REQUIREMENTS OF CATEGORY B, WELL-TRIED PARTS AND WELL-TRIED SAFETY PRINCIPLE MUST BE USED. | SAFETY FUNCTION IS LOST WHEN FAULT OCCURS, BUT PROBABILITY OF FAULT IS LOWER THAN THAT OF CATEGORY B. | | HIGH | NULL | |
| 2 | IN ADDITION TO REQUIREMENTS OF CATEGORY B, WELL-TRIED SAFETY PRINCIPLE MUST BE USED. MACHINE CONTROL SYSTEM MUST INSPECT SAFETY FUNCTIONS AT SUITABLE INTERVALS. | WHEN FAULT OCCURS BETWEEN INSPECTIONS, SAFETY FUNCTION IS LOST. LOSS OF SAFETY FUNCTION IS DETECTED BY INSPECTION. | | FROM LOW TO HIGH | FROM LOW TO MEDIUM | |
| 3 | IN ADDITION TO REQUIREMENTS OF CATEGORY B, WELL-TRIED SAFETY PRINCIPLE MUST BE USED. SAFETY-RELATED PARTS MUST BE DESIGNED ACCORDING TO THE FOLLOWINGS: • SINGLE FAULT DOES NOT LOSS SAFETY FUNCTION. • SINGLE FAULT IS DETECTED AS FAR AS POSSIBLE. | SAFETY FUNCTION IS MAINTAINED EVEN WHEN SINGLE FAULT OCCURS. BUT CERTAIN TYPE OF SINGLE FAULTS CANNOT BE DETECTED SO THAT THE SAFETY FUNCTION IS LOST DUE TO ACCUMULATION OF FAULTS. | PRIMARILY BY CONFIGURATION | FROM LOW TO HIGH | FROM LOW TO MEDIUM | |
| 4 | IN ADDITION TO REQUIREMENTS OF CATEGORY B, WELL-TRIED SAFETY PRINCIPLE MUST BE USED. SAFETY-RELATED PARTS MUST BE DESIGNED ACCORDING TO THE FOLLOWINGS: • SINGLE FAULT DOES NOT LOSS SAFETY FUNCTION. • SINGLE FAULT IS DETECTED BEFORE OPERATION OF NEXT SAFETY FUNCTION. SAFETY FUNCTION IS NOT LOST DUE TO ACCUMULATION OF UNDETECTABLE SINGLE FAULTS. | SAFETY FUNCTION IS MAINTAINED EVEN WHEN SINGLE FAULT OCCURS. PROBABILITY OF FAULT ACCUMULATION IS LOW OWING TO HIGH DC. FOR PREVENTING LOSS OF SAFETY FUNCTION, FAULT IS DETECTED WITH A CERTAIN TIME. | | HIGH | HIGH INCLUDING ACCUMULATION OF DEFECTS | 65 PTS OR MORE |

VALVE CONTROL SYSTEM AND VALVE CONTROL METHOD

This application claims priority from Japanese Patent Application No. 2010-047931 filed on Mar. 4, 2010 in the Japan Patent Office, the disclosure of which is incorporated herein by reference in its entirety.

BACKGROUND OF THE INVENTION

1. Field of the Invention

The present invention relates to a valve control system and a valve control method, and more particularly to a valve control system and a valve control method that can meet safety standards.

2. Description of the Background Art

FIG. 13 illustrates an example of a conventional general-purpose valve. Referring to FIG. 13, a valve 101 is arranged in a pipe 1 through which a fluid (e.g., air, water, oil or the like) flows. Valve 101 can be opened by an electric signal, and specifically is a solenoid valve.

A spring 104 pushes a spool 102 so that valve 101 is normally closed. When the electric signal turns on a solenoid 103, solenoid 103 moves spool 102. Thereby, valve 101 opens. When solenoid 103 is turned off, a force of spring 104 returns spool 102 to an original position. Thereby, valve 101 closes.

In addition to the above general-purpose valve, valves meeting the safety standards have been provided (see "ISO valves in accordance with 5599-1 with position sensing of the piston spool", "Safety engineering guidelines", p62, [online], FESTO, [searched on Nov. 12, 2009], see Internet <URL: http://www.festo.com/net/fi_fi/downloads/Download.ashx?Ink=29273/HB_Safet y_en.pdf>). FIG. 14 illustrates an example of a valve meeting the safety standards.

Referring to FIG. 14, components that are the same as or correspond to those of the general-purpose valve shown in FIG. 13 bear the same reference numbers. A valve 110 complying with the safety standards (e.g., ISO 13849-1) is provided with a limit switch 115 for detecting opening/closing of valve 110.

When solenoid 103 is turned on, spool 102 turns on limit switch 115. Conversely, when solenoid 103 is off, spring 104 returns spool 102 to turn off limit switch 115. According to the structure shown in FIG. 14, the limit switch can detect the open and closed states of valve 110.

FIG. 15 illustrates an example of a structure of a conventional control system complying with the safety standards. Referring to FIG. 15, a valve control system 150 includes valves 110A and 110B as well as a safety controller 120.

Valves 110A and 110B are safety-standard-meeting valves and arranged in series in pipe 1. Each of valves 110A and 110B has the same structure as valve 110 shown in FIG. 14. A limit switch 115A detects the opening and closing of valve 110A, and a limit switch 115B detects the opening and closing of valve 110B.

Safety controller 120 receives signals in1 and in2 from limit switches 115A and 115B, respectively, and provides signals out1 and out2 for controlling solenoids 103A and 103B, respectively.

Safety controller 120 controls valves 110A and 110B as described below. First, when safety controller 120 simultaneously turns on signals out1 and out2 so that solenoids 103A and 103B are turned on, respectively.

Then, safety controller 120 checks that both signals in1 and in2 are on. When both signals in1 and in2 are on, both valves 110A and 110B are open. Therefore, safety controller 120 continues the on states of signals out1 and out2.

Valves 110A and 110B, limit switches 115A and 115B, and safety controller 120 are components satisfying the safety standards. Valve control system 150 shown in FIG. 15 can satisfy the predetermined safety standards.

The above safety standards are, e.g., ISO 13849-1. The structure shown in FIG. 15 can comply with a category 4 defined by ISO 13849-1.

When one studies safety protection in measures for reducing a risk of a machine, estimation of a magnitude of the risk as well as a performance reference of the safety system corresponding to it has been generally represented by the "category" in the European standards EN 954-1 or the international standards ISO 13849-1:1999 based on it. The "category" is an architecture of the safety control system, and is based on a so-called definite technique provided by electro-mechanism parts such as a contact-point technique of switches and relays that have been built up.

FIG. 16 illustrates categories defined by ISO 13849-1: 1999. Referring to FIG. 16, ISO 13849-1:1999 defines five categories "B", "1", "2", "3" and "4". As the category changes from "B" toward "4", the achievement level of the performance reference increases.

The revised edition of ISO 13849-1 defines five indexes from "a" to "e" that are called "PL (Performance Levels)" as the indexes of evaluation of the safety control system. The PL has taken concepts of "reliability" and "quality" into the conventional concept of the "category", and evaluates the Mean Time To Dangerous Failure (MTTFd), DCavg (Average Diagnostic Coverage) and Common Cause Failure (CCF). The PL can quantitatively evaluate the safety control system according to a state of actual use.

The official name of the revised edition of ISO 13849-1 is "ISO 13894-1 (Second edition Nov. 1, 2006) Safety of machinery Safety-related parts of control systems, Part 1: General principles for design). In the following description, the revised edition of ISO 13894-1 will be described as "ISO 13849-1:2006".

According to ISO 13849-1:2006, important matters of the safety control system required in each category are the same as those of ISO 13849-1:1999 or EN 954-1. However, each safety control system is diagrammatized by handling three parts, i.e., I (Input unit), L (Logic unit) and O (Output unit) as axes for clearly showing respective features.

FIG. 17 is a block diagram for illustrating important matters of the safety control system required in each category represented by ISO 13849-1:2006.

Referring to FIG. 17, the structures applied to the categories B and 1 can be implemented by I, L and O. The structure applied to category 2 can be implemented by adding a TE (TEst unit) to the above I, L and O. The structure applied to the categories 3 and 4 can be implemented by duplexing the above I, L and O. The category 4 differs from the category 3 in that it requires a higher detection capability than the category 3, but employs the same structure as the category 3.

FIG. 18 is a graph for illustrating a method of evaluating the performance level. Referring to FIG. 18, four parameters, i.e., a category (indicated as "Cat" in FIG. 18), MTTFd, DCavg and CCF are used for evaluating the PL.

As shown in FIG. 18, there is a plurality of combinations of the parameters that can achieve the performance level of, e.g., "c". In other words, appropriate combinations of the foregoing four parameters can achieve the desired performance level. Therefore, it can be considered that ISO 13849-1:2006 achieves more flexibility in construction of the safety system than conventional ISO 13849-1:1999.

For example, a system in a factory uses the general-purpose valves shown in FIG. 13 in many portions. Conventionally, for constructing an existing system to comply with the safety standards (e.g., category 3 or 4 of ISO 13849-1), it is necessary to add the safety-standard-meeting valves to the system and further to duplex such safety-standard-meeting valves.

However, as can be seen from a comparison between FIGS. 13 and 14, the safety-standard-meeting valve is a special part that differs in structure from the general-purpose valve. For example, therefore, the following problems occur when the safety-standard-meeting valves are introduced into the existing system for constructing a system meeting the safety standards.

First, design of the system is complicated because the safety-standard-meeting valves that are the special parts are added to the existing system. Also, it becomes necessary to manage the stock of the safety-standard-meeting valves in addition to that of the general-purpose valves for operating the system. Therefore, the stock management becomes complicated, and the management for maintaining the system becomes complicated.

Since the safety-standard-meeting valves are special parts, choices or options thereof are fewer than those of the general-purpose valves. This restricts the system design. Since the safety-standard-meeting valve is generally more expensive than the general-purpose valve, the cost for constructing and maintaining the system may increase.

Further, the safety-standard-meeting valve has a switch for detecting the opening and closing thereof, and therefore has larger sizes than the general-purpose valve. When the safety-standard-meeting valve is introduced into the existing system, the scale of the system may increase. Therefore, the arrangement of the safety-standard-meeting valves significantly restricts the design of the system. Thus, the safety-standard-meeting valve restricts the flexibility in system design.

When the safety-standard-meeting valves are employed, the completely open state and the completely closed state can be checked by matching the stroke of the spool with the stroke of the limit switch. However, this structure results in a problem that a state (e.g., a slightly open state) intermediate between the completely open state and the completely closed state cannot be detected.

As described above, the conventional valve control system complying with the safety standards suffers from a problem that the structures and specifications of the safety-standard-meeting valves restrict the specifications of the system.

SUMMARY OF THE INVENTION

An object of the invention is to provide a valve control system and a control method thereof that allow easy design, maintenance and the like, and can meet the safety standards.

A valve control system according to one aspect of the invention includes first and second valves, first and second sensors, and a control device. The first valve is arranged in a flow path configured for a flow of fluid and is openable and closable according to a first electric signal. The second valve is arranged in the flow path at a position downstream of said first valve, said second valve being openable and closable according to a second electric signal. The first sensor is arranged in the flow path, and positioned between the first and second valves to detect a state of fluid flowing from the first valve. The second sensor is arranged in the flow path, and positioned downstream from the second valve to detect a state of fluid flowing from the second valve. The control device (also referred to as "safety controller") is configured to satisfy safety standards and is configured to control the first and second valves based on a result of detection of the first sensor and a result of detection of the second sensor.

Preferably, the control device is configured to check that the result of detection of the first sensor indicates that the fluid is not flowing from the first valve and that the result of detection of the second sensor indicates that fluid is not flowing from the second valve; to execute first control to open the first valve after the result of detection of the first sensor and the result of detection of the second sensor are checked; to check that the flow of fluid from the first valve is indicated by the result of detection of the first sensor performed after a first period elapsed since execution of the first control; to execute second control to open the second valve in response to changing of the result of detection of the first sensor; to check that the flow of fluid from the second valve is indicated by the result of detection of the second sensor performed after a second period elapsed since execution of the second control; and to keep the first and second valves in an open state.

Preferably, the control device is configured to end the control of the first and second valves without executing the first control (which may be configured to be executed at an initial time) and second control when the result of detection of the first sensor indicates that the fluid is flowing from the first valve, in spite of the fact that the first control is not executed (i.e., before the initial time elapses). Preferably, the control device is configured to end the control of the first and second valves without executing the first control (which may be configured to be executed at an initial time) and second control (which may be configured to be executed at a later time) when the result of detection of the second sensor indicates that the fluid is flowing from the second valve, in spite of the fact that the first and second control is not executed (i.e., before the initial time and later time elapse).

Preferably, the control device is configured to end the control of the first and second valves by controlling the first valve to close and not executing the second control, when the result of detection of the first sensor does not change after elapsing of the first period in spite of the fact that the first control was executed. In this regard, the first control may be configured to be executed at an initial time, with the first period that elapses occurring subsequent to the initial time. Preferably, the control device is configured to end the control of the first and second valves by controlling the first valve to close, when the result of detection of the second sensor indicates that the fluid is flowing from the second valve in a stage where the first control is executed and the second control is not executed. In this regard, the first control may be configured to be executed at an initial time and the second control may be configured to be executed at a later time. Preferably, the control device is configured to end the control of the first and second valves by controlling the first and second valves to close, when the result of detection of the second sensor does not change after elapsing of the second period in spite of the fact that the second control was executed. In this regard, the first control may be configured to be executed at an initial time and the second control may be configured to be executed at a later time, with the second period that elapses occurring subsequent to the later time elapsing. Preferably, each of the first and second sensors includes a switch operating in response to the flow of fluid through the flow path.

Preferably, the switch is a pressure switch operating in response to a pressure of the fluid.

A valve control method according to another aspect of the invention is a valve control method performed by a valve control system. The valve control system includes first and second valves, first and second sensors, and a control device.

The first valve is arranged in a flow path configured for a flow of fluid, and the first valve is openable and closable according to a first electric signal. The second valve is arranged in the flow path at a position downstream of the first valve, and the second valve is openable and closable according to a second electric signal. The first sensor is arranged in the flow path, and is positioned between the first and second valves to detect a state of fluid flowing from the first valve. The second sensor is arranged in the flow path, and is positioned downstream from the second valve to detect a state of fluid flowing from the second valve. The control device (also referred to as "safety controller") is configured to satisfy safety standards and controls the first and second valves based on a result of detection of the first sensor and a result of detection of the second sensor. The valve control method includes the steps of checking that the result of detection of the first sensor indicates that the fluid is not flowing from the first valve and that the result of detection of the second sensor indicates that the fluid is not flowing from the second valve; executing first control to open the first valve after the result of detection of the first sensor and the result of detection of the second sensor are checked; checking that the flow of the fluid from the first valve is indicated by the result of detection of the first sensor performed after a first period elapsed since execution of the first control; executing second control to open the second valve in response to changing of the result of detection of the first sensor; and checking that the flow of the fluid from the second valve is indicated by the result of detection of the second sensor performed after a second period elapsed since execution of the second control.

Preferably, the valve control method further includes providing the first control to be executable at an initial time and a step of keeping the second valve in a closed state when the result of detection of the first sensor indicates that the fluid is flowing from the first valve, in spite of the fact that the first control is not executed (i.e., before the initial time elapses).

Preferably, the valve control method further includes providing the first control to be executable at an initial time and the second control to be executable at a later time, and a step of controlling the first valve to close when the result of detection of the second sensor indicates that the fluid is flowing from the second valve, in spite of the fact that the first and second control is not executed (i.e., before the initial time and later time elapse).

Preferably, the valve control method further includes providing the first control to be executable at a initial time and a step of controlling the first valve to close when the result of detection of the first sensor does not change after elapsing of the first period in spite of the fact that the first control was executed, i.e., with elapsing of the first period occurring subsequent to the initial time elapsing.

Preferably, the valve control method further includes providing the first control to be executable at an initial time and the second control to be executable at a later time, and a step of controlling the first valve to close when the result of detection of the second sensor indicates that the fluid is flowing from the second valve in a stage where the first control is executed and the second control is not executed.

Preferably, the valve control method further includes providing the first control to be executable at an initial time and the second control to be executable at a later time, and a step of controlling the first and second valves to close when the result of detection of the second sensor does not change after elapsing of the second period in spite of the fact that the second control was executed, i.e., with the elapsing of the second period occurring subsequent to the later time.

Therefore, the invention can implement the valve control system that allows easy design and easy management in maintenance, and can meet the safety standards.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a first time chart for illustrating control of the valve by the safety controller.

FIG. 7 is a second time chart for illustrating the control of the valve by the safety controller.

FIG. 8 is a third time chart for illustrating the control of the valve by the safety controller.

FIG. 9 is a fourth time chart for illustrating the control of the valve by the safety controller.

FIG. 16 illustrates categories defined by ISO 13849-1: 1999.

DESCRIPTION OF THE PREFERRED EMBODIMENTS

Figure 1:
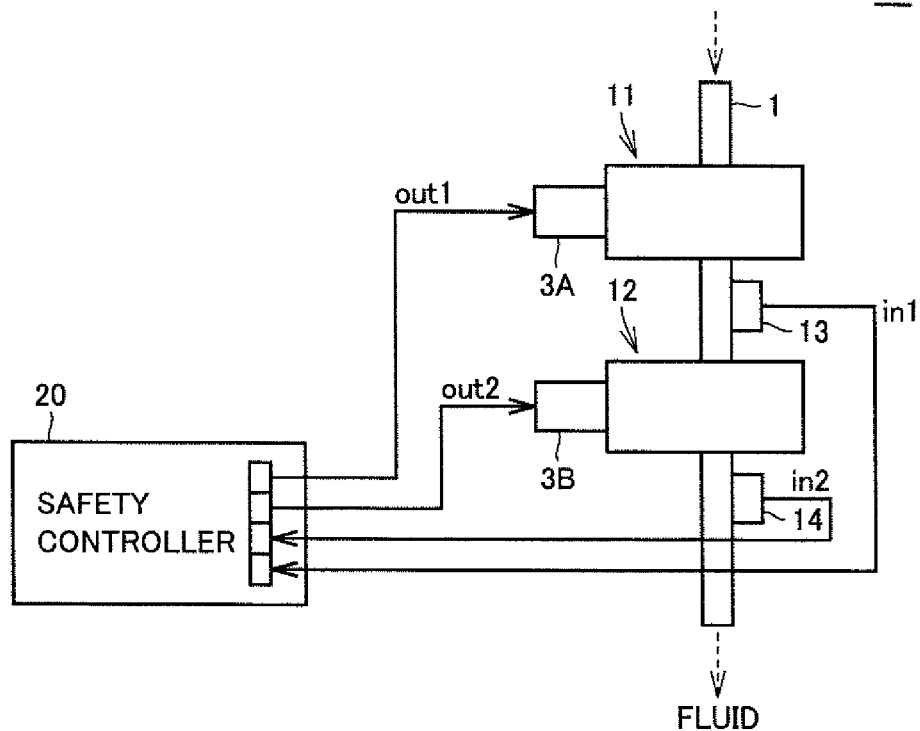
FIG. 1 shows a structure of a valve control system according to an embodiment of the invention.

Embodiments of the invention will now be described with reference to the drawings. In the drawings, the same or corresponding portions bear the same reference numbers, and description thereof is not repeated.

FIG. 1 shows a structure of a valve control system according to an embodiment of the invention. Referring to FIG. 1, a valve control system 50 includes valves 11 and 12, sensors 13 and 14, and a safety controller 20. Valve control system 50 is introduced into, e.g., a system of a factory.

Valves 11 and 12 are arranged on a pipe 1 that is a flow path of a fluid. Valve 12 is arranged in a portion of pipe 1 downstream from valve 11. The fluid flowing through pipe 1 may be either a gas or a liquid. Also, a specific kind of the fluid is not restricted. Further, a material, a sectional shape and the like of pipe 1 are not particularly restricted.

Valves 11 and 12 can be opened and closed by electric signals. Specifically, valves 11 and 12 are general-purpose solenoid valves, and include solenoids 3A and 3B that can be turned on/off according to the electric signals, respectively.

Figure 2:
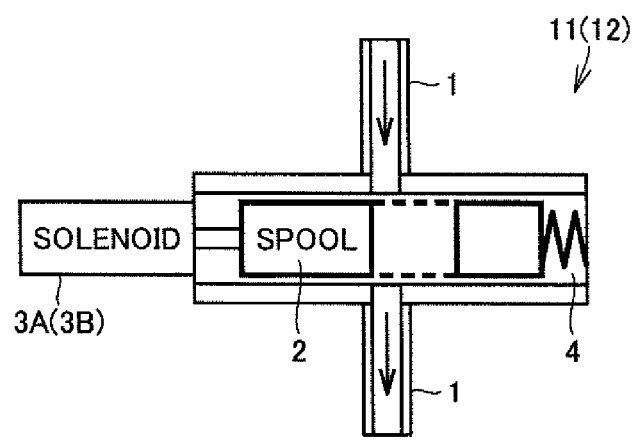
FIG. 2 illustrates an example of a structure of a general-purpose valve shown in FIG. 1.

As shown in FIG. 2, each of valves 11 and 12 includes a spool 2, a solenoid (3A or 3B) and a spring 4. When solenoid 3A is off, spring 4 pushes spool 2 to close valve 11 (12). When solenoid 3A (3B) is turned on, solenoid 3A (3B) moves spool 2. Thereby, valve 11 (12) enters an open state. When solenoid 3A (3B) is turned off, a force of spring 4 pushes and returns spool 2. Thereby, valve 11 (12) enters a closed state.

Returning to FIG. 1, sensor 13 is arranged between valves 11 and 12 in pipe 1, and detects a state of flow of the fluid from valve 11. Sensor 14 is arranged in a position of pipe 1 downstream from valve 12, and detects a state of flow of the fluid from valve 12. Each sensor provides a signal indicating a result of the detection.

When the fluid is flowing from valve 11, sensor 13 turns on a signal in1. When the fluid is not flowing from valve 11, sensor 13 turns off signal in1. Likewise, when the fluid is flowing from valve 12, sensor 14 turns on signal in2. When the fluid is not flowing from valve 12, sensor 14 turns off signal in2.

This embodiment uses general-purpose pressure switches as sensors 13 and 14, respectively. These pressure switches are a kind of switches that operate in response to flowing of the fluid through the flow path. Specifically, when the fluid flows through pipe 1 to increase an internal pressure of pipe 1, the pressure switch is turned on. When the flow of fluid stops and the internal pressure of pipe 1 lowers, the pressure switch is turned off. A pressure value for turning on/off the pressure switch is regulated in advance. The structure of the general-purpose pressure switch is well known, and therefore description thereof is not repeated.

Safety controller 20 controls valves 11 and 12 based on results of detection by sensors 13 and 14. Specifically, based on signals in1 and in2 provided from sensors 13 and 14, respectively, safety controller 20 provides a signal out1 for controlling solenoid 3A to solenoid 3A and provides a signal out2 for controlling solenoid 3B to solenoid 3B.

Safety controller 20 turns on signal out1 for turning on solenoid 3A, and turns off signal out1 for turning off solenoid 3A. Likewise, safety controller 20 turns on signal out2 for turning off solenoid 3B, and turns off signal out2 for turning off solenoid 3B.

For example, safety controller 20 is a PLC (Programmable Logic Controller), and is configured to satisfy predetermined safety standards. In this embodiment, safety controller 20 is configured for use in a safety system corresponding to, e.g., the category 4 of the foregoing "ISO 13849-1:2006".

Figure 3:
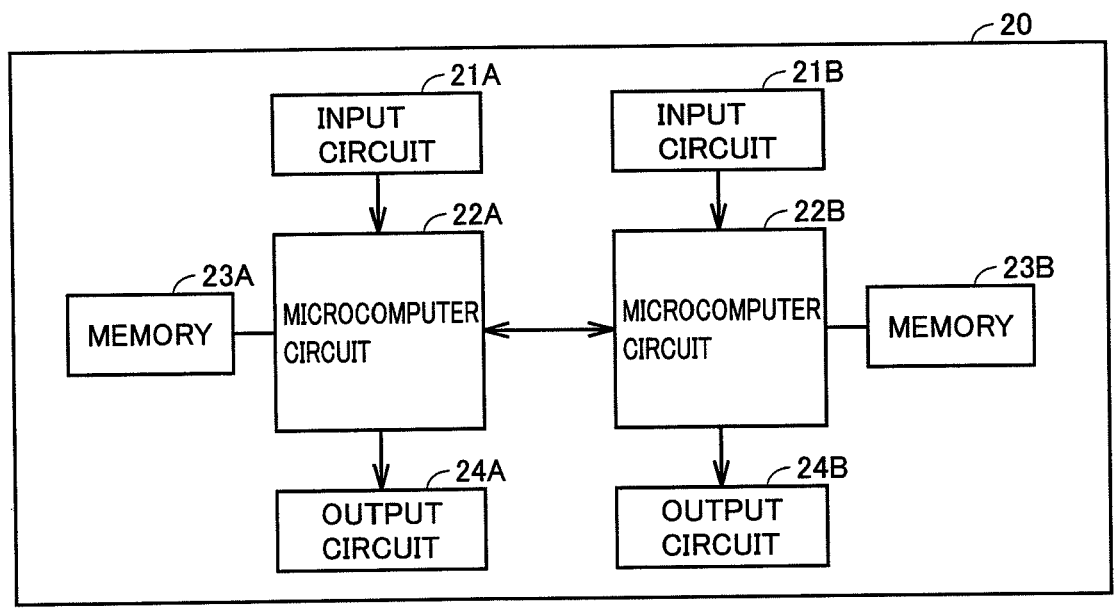
FIG. 3 is a block diagram showing an example of a structure of a safety controller shown in FIG. 1.

FIG. 3 is a block diagram showing an example of the structure of safety controller shown in FIG. 1. Referring to FIG. 3, safety controller 20 has a structure in which the input circuits, output circuits, logic circuits and memory circuits are duplexed. More specifically, safety controller 20 has input circuits 21A and 21B, microcomputer circuits 22A and 22B, memories 23A and 23B, and output circuits 24A and 24B. Microcomputer circuits 22A and 22B correspond to the foregoing logic units, respectively.

Failure modes that may occur in this hardware (safety controller 20) are estimated in advance, and appropriate self-diagnosis for detecting them are assigned to microcomputers 22A and 22B and are periodically executed. When the failure is detected, safety controller 20 changes to the safe state that has been defined by the design. This can avoid occurrence of an unsafe state due to a hardware failure.

Figure 4:
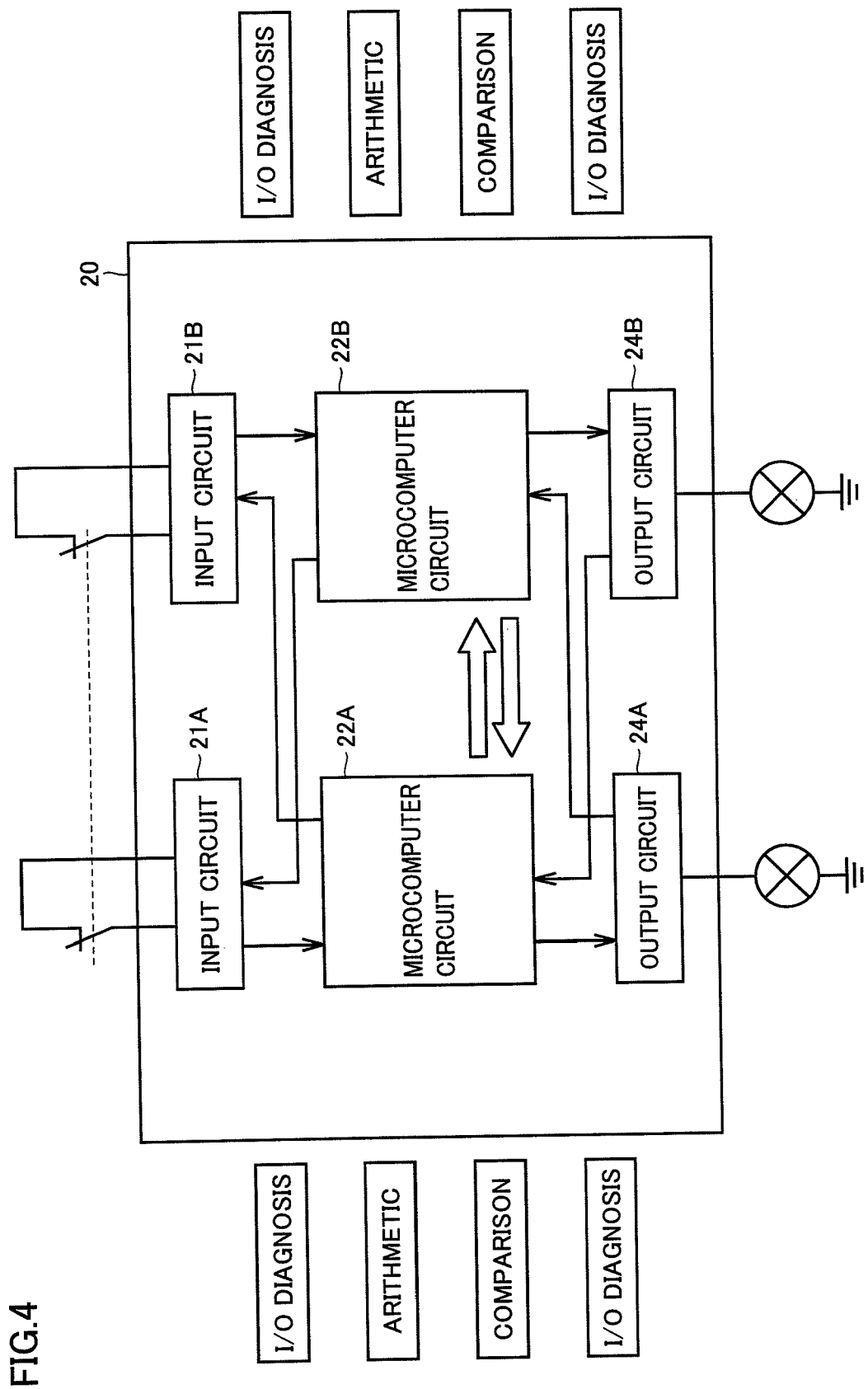
FIG. 4 illustrates arithmetic processing of safety I/O data of the safety controller shown in FIG. 1.

FIG. 4 illustrates arithmetic processing of safety I/O data of the safety controller shown in FIG. 1. Referring to FIG. 4, each of microcomputers 22A and 22B has a monitoring function and a control function. Specifically, microcomputers 22A and 22B monitor input circuits 21A and 21B, and output circuits 24A and 24B, respectively. Further, microcomputers 22A and 22B monitor each other.

Microcomputer circuits 22A and 22B perform redundancy arithmetic on diagnosed safety I/O data. Microcomputers 22A and 22B compare two results of the arithmetic and check the matching between these results.

As shown in FIGS. 3 and 4, safety controller 20 has the structure in which input circuits (I), logic circuits (L) and output circuits (O) are duplexed. Further, safety controller 20 has the diagnosis function, and detects a failure within a certain time for preventing loss of the safety function. Therefore, safety controller 20 has the structure available in the safety system meeting the category 4 (see FIG. 16) of ISO 13849-1:2006.

Figure 5:
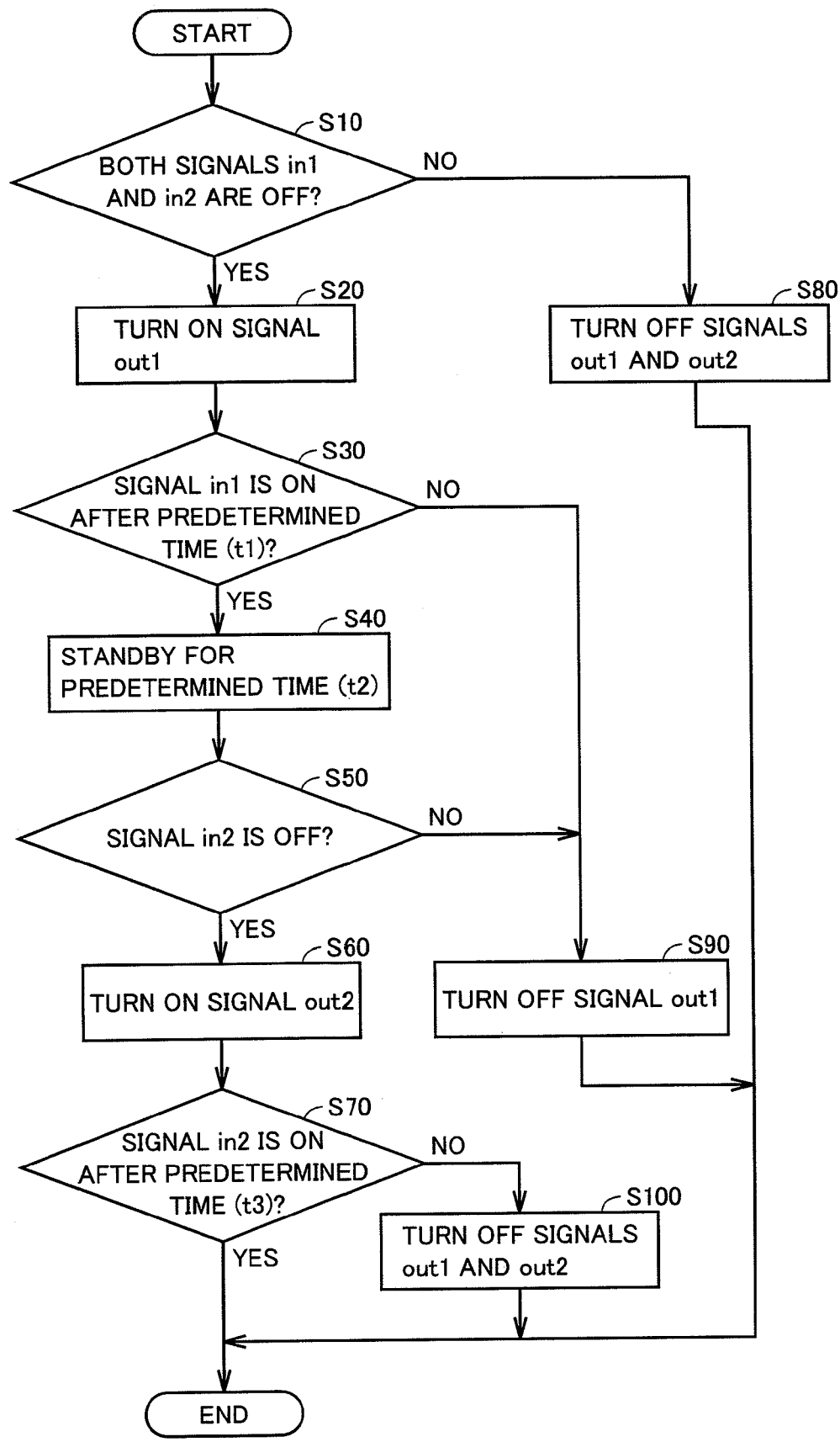
FIG. 5 is a flowchart for illustrating a flow of valve control by the safety controller shown in FIG. 1.

FIG. 5 is a flowchart for illustrating a flow of the valve control by the safety controller shown in FIG. 1. Referring to FIG. 5, when the processing starts, safety controller 20 determines in a step S10 whether both signals in1 and in2 are off or not. When both signals in1 and in2 are off (YES in step S10), the process proceeds to a step S20.

In step S20, safety controller 20 turns on signal out1. This control corresponds to first control for opening valve 11. When valve 11 is normal, valve 11 opens in response to the turn-on of signal out1.

In a step S30, safety controller 20 determines whether signal in1 is on after a predetermined time (t1) from the turn-on of signal out1, or not. For example, safety controller 20 determines whether signal in1 is on or not, when the predetermined time (t1) elapses since the turn-on of signal out1. However, safety controller 20 may periodically determine whether signal out1 is on or not, after signal out1 is turned on. Predetermined time t1 corresponds to a "first period" in the invention.

When it is determined that signal in1 is on (YES in step S30), the process proceeds to a step S40. In step S40, safety controller 20 will be on standby for a predetermined time (t2).

In a step S50, safety controller 20 determines whether signal in2 is off or not. When it is determined that signal in2 is off (YES in step S50), the process proceeds to a step S60.

In step S60, safety controller 20 turns on signal out2. This control corresponds to second control for opening valve 12. When valve 12 is normal, turned-on signal out2 opens valve 12.

In a step S70, safety controller 20 determines whether signal in2 is in the on state after a predetermined time (t3) from the turn-on of signal out2, or not. For example, similarly to the processing in step S30, safety controller 20 determines whether signal in2 is on or not, when the predetermined time (t3) elapses since the turn-on of signal out2. The predetermined time t3 corresponds to a "second period" in the invention.

When the processing in step S70 ends, the whole processing ends. The above flow is a control flow in the case where valves 11 and 12 as well as sensors 13 and 14 are normal.

Conversely, when it is determined in step S10 that at least one of signals in1 and in2 is on (NO in step S10), the process proceeds to a step S80. In step S80, safety controller 20 turns off both signals out1 and out2.

For example, when signal in1 is on in spite of the fact that the first control is not executed, there is a possibility that an open-failure has occurred in valve 11 or an on-failure has occurred in sensor 13. When signal in2 is on in spite of the fact that the first control is not executed, sensor 14 may have an on-failure. In these cases, both signals out1 and out2 are turned off so that at least valves 12 can be kept in the closed state.

When it is determined in step S30 that signal in1 is off (NO in step S30), the process proceeds to a step S90. In step S90, safety controller 20 turns off signal out1.

When signal out1 is turned off, valve 11 closes. When signal in1 is in the off state in spite of the fact that time t1 elapsed since the turn-on of signal out1, there is a possibility that sensor 13 has an off-failure or valve 11 has a failure in opening. In this case, signal out1 is turned off so that valve 11 is controlled to close. Since signal out2 keeps the off state, valve 12 is also controlled to close.

Likewise, when it is determined in step S50 that signal in2 is on (NO in step S50), the process proceeds to step S90. When both signals in1 and in2 are turned on before the second control is executed, it can be considered that this state is caused by the on-failure of valve 12. In this case, therefore, signal out1 is turned off to close both valves 11 and 12.

When it is determined in step S70 that signal in2 is in the off state after time t4 elapsed since signal out2 was turned on (NO in step S70), the process proceeds to a step S100. In step S100, safety controller 20 turns off both signals out1 and out2. When signal in2 is off in spite of the fact that signal out2 is turned on, there is a possibility that sensor 14 has an off-failure or valve 12 has a failure in opening. In this case, signals out1 and out2 are turned off so that valves 11 and 12 are controlled to close. The whole processing also ends after any one of steps S80-S100 is executed.

FIG. 6 is a first time chart for illustrating the control of the valve by the safety controller. FIG. 6 shows the control of valves 11 and 12 in the state where valves 11 and 12 as well as sensors 13 and 14 are normal.

Referring to FIG. 6, at or before a time ts, safety controller 20 checks that signal in1 indicates not-flowing of the fluid from valve 11, and signal in2 indicates not-flowing of the fluid from valve 12. Specifically, safety controller 20 checks that both signals in1 and in2 are off (step S10).

At time ts, safety controller 20 starts to control valves 11 and 12. First, at time ts, safety controller 20 turns on signal out1 (step S20). Thus, the first control is executed.

After time t1 elapsed since the turn-on of signal out1, safety controller 20 checks that signal in1 is on (step S30). After checking that signal in1 is on, safety controller 20 keeps the standby state for predetermined time t2 (step S40). After elapsing of predetermined time t2, safety controller 20 checks that signal in2 is off (step S50).

After safety controller 20 checks that signal in2 is off, it turns on signal out2 (step S60). Thus, the second control is executed. After time t3 elapsed since signal out2 was turned on, safety controller 20 checks that signal in2 is on (step S70). In this case, valves 11 and 12 are kept in the open state. Therefore, the final output (i.e., output of the flow from valve 12) occurs.

Figure 14:
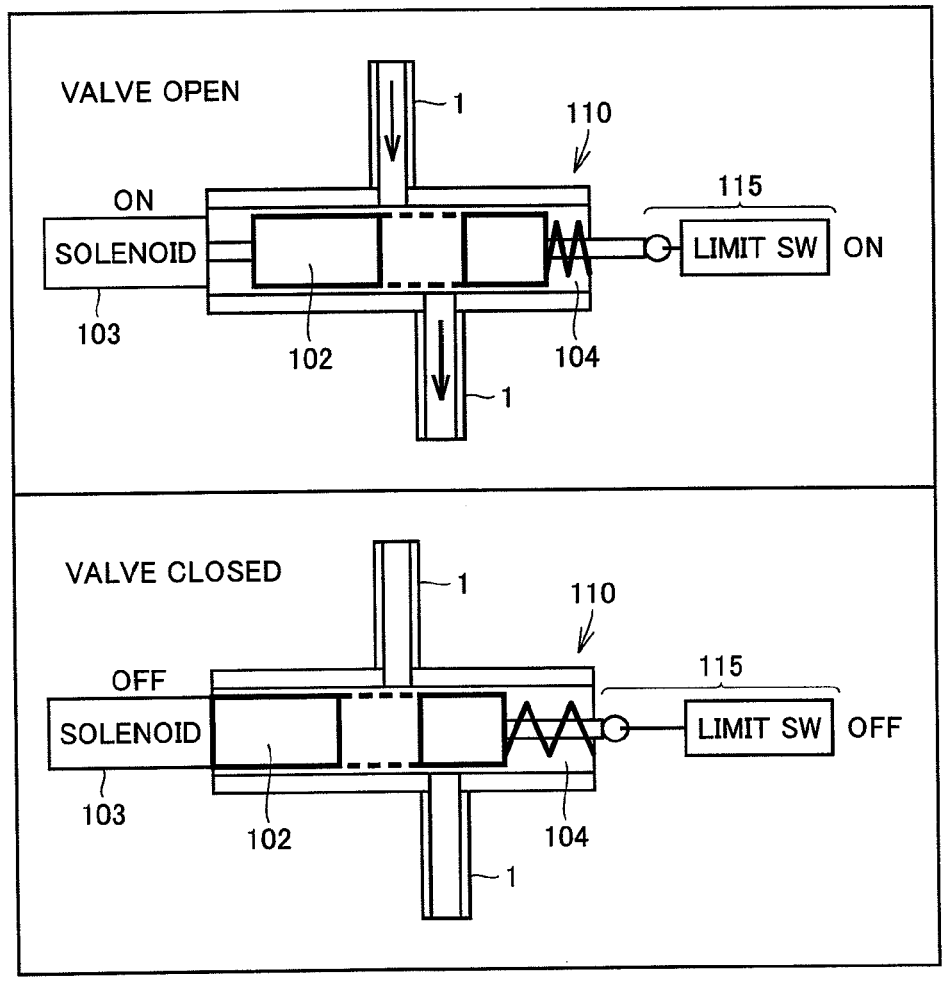
FIG. 14 illustrates an example of a valve meeting the safety standards.
Figure 15:
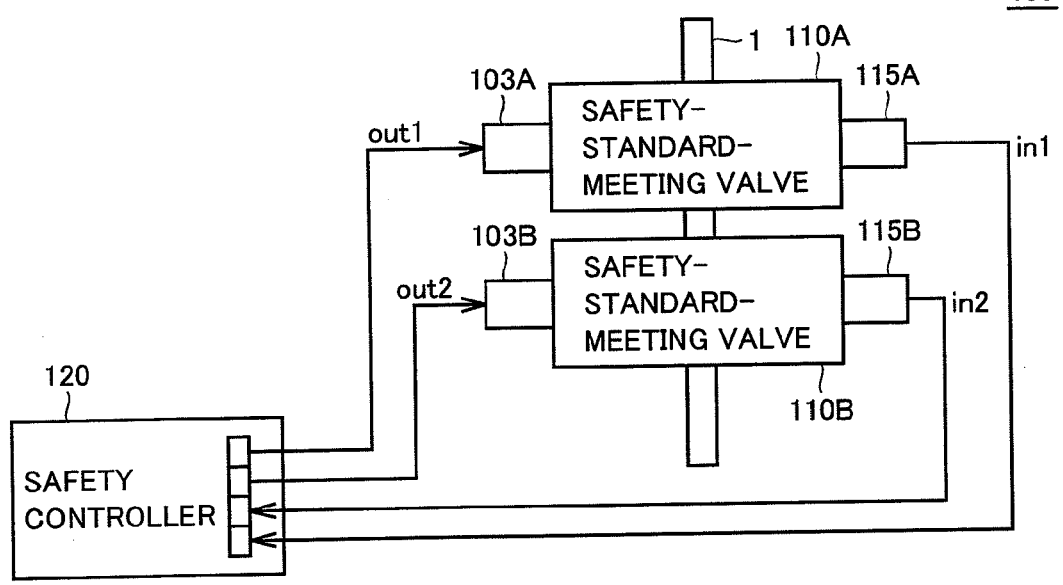
FIG. 15 illustrates an example of a structure of a conventional control system complying with the safety standards.
Figure 17:
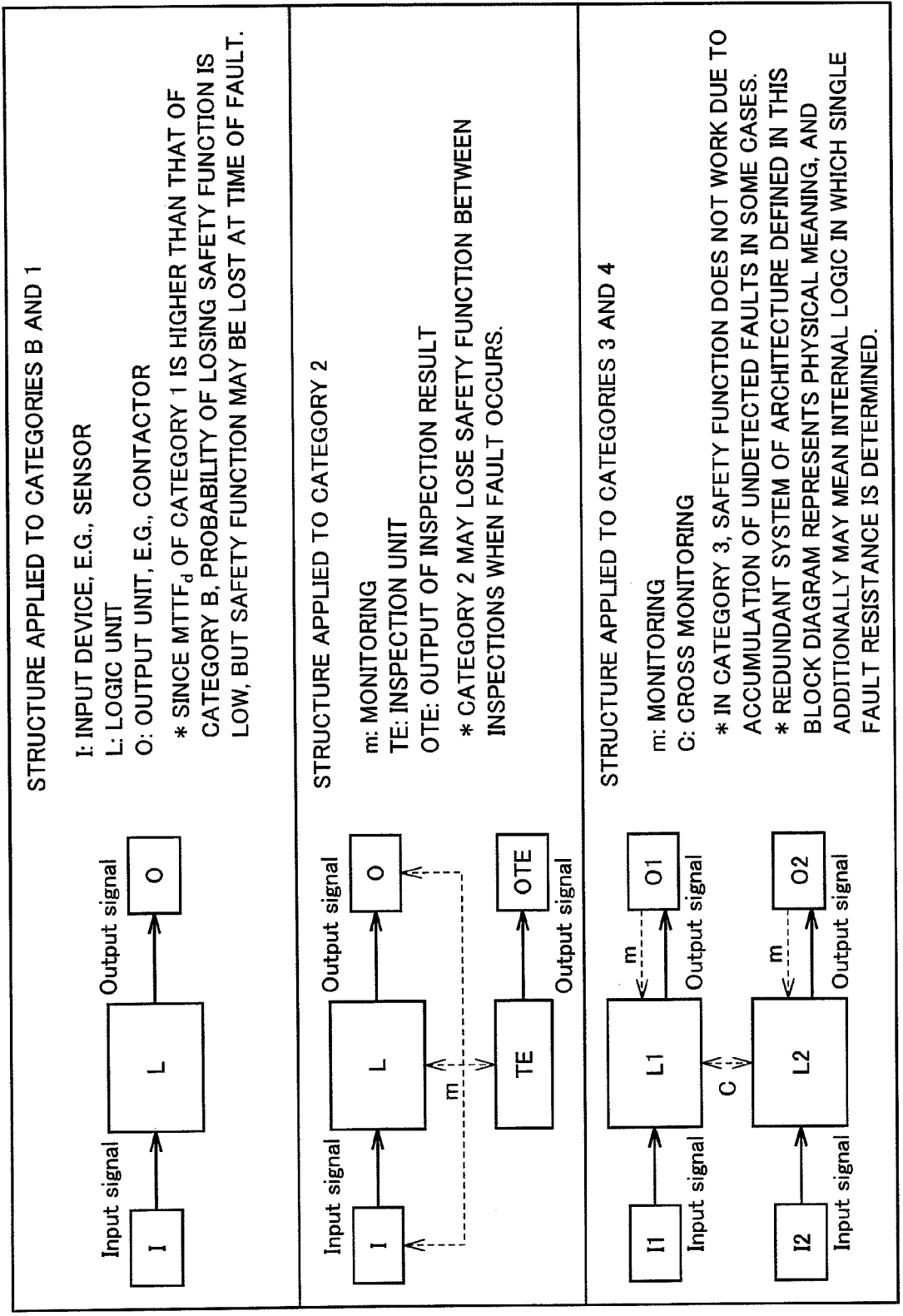
FIG. 17 is a block diagram for illustrating important matters of the safety control system required in each category represented by ISO 13849-1:2006.

In the safety-standard-meeting valve shown in FIG. 14, the limit switch detects the position of the spool. Therefore, it is not necessary to monitor the elapsing of the predetermined periods (t1, t2 and t3), in contrast to the embodiment.

In this embodiment, however, the pressure switch detects the state of flow of the fluid from the valve, and thereby it is detected whether the valve is open or not. Therefore, a certain time is required after signal out1 (or our2) is turned on, for detecting whether the general-purpose valve is normally operating or not (i.e., whether fixing of the spool due to mixing of a foreign substance into the spool has occurred or not). Since signals out1 and out2 are turned on according to the procedures shown in FIG. 5 or 6, it becomes possible to determine by the pressure switch whether the valve is open or closed, similarly to the limit switch arranged in the safety-standard-meeting valve.

FIG. 7 is a second time chart for illustrating the control of the valve by the safety controller. FIG. 7 shows the control of valves 11 and 12 in the case where valve 11 has an open-failure or sensor 13 corresponding to valve 11 has an on-failure. This control corresponds to the processing performed when the result of determination in step S10 shown in FIG. 5 is NO.

Referring to FIG. 7, at or before time ts, safety controller 20 detects that signal in1 is on. In this case (NO in step S10), safety controller 20 keeps both signals out1 and out2 in the off state (step S80), and ends the whole control. Thus, it ends the whole control without executing the first control (processing in step S20) and the second control (processing in step S60). Therefore, at least valve 12 is kept in the closed state so that the final output does not occur.

FIG. 8 is a third time chart for illustrating the control of the valve by the safety controller. FIG. 8 shows the control of valves 11 and 12 performed when sensor 14 corresponding to valve 12 has an on-failure. This control likewise corresponds to the processing performed when the result of determination in step S10 shown in FIG. 5 is NO.

Referring to FIG. 8, at or before time ts, safety controller 20 detects that signal in2 is on. In this case (NO in step S10), safety controller 20 keeps both signals out1 and out2 in the off state (step S80), and ends the whole control. In this case, the final output does not occur.

FIG. 9 is a fourth time chart for illustrating the control of the valve by the safety controller. FIG. 9 shows the control of valves 11 and 12 performed when sensor 13 has an off-failure. This control corresponds to the processing performed when the result of determination in step S30 shown in FIG. 5 is NO.

Referring to FIG. 9, at or before time ts, both signals in1 and in2 are off. Therefore, safety controller 20 turns on signal out1 at time ts (step S20). However, signal in1 keeps the off state even after time t1 elapsed since time ts. When safety controller 20 detects that signal in1 is off (NO in step S30), safety controller 20 turns off signal out1 (step S90), and ends the whole processing. In this case, signal out2 keeps the off state so that the final output does not occur.

Figure 10:
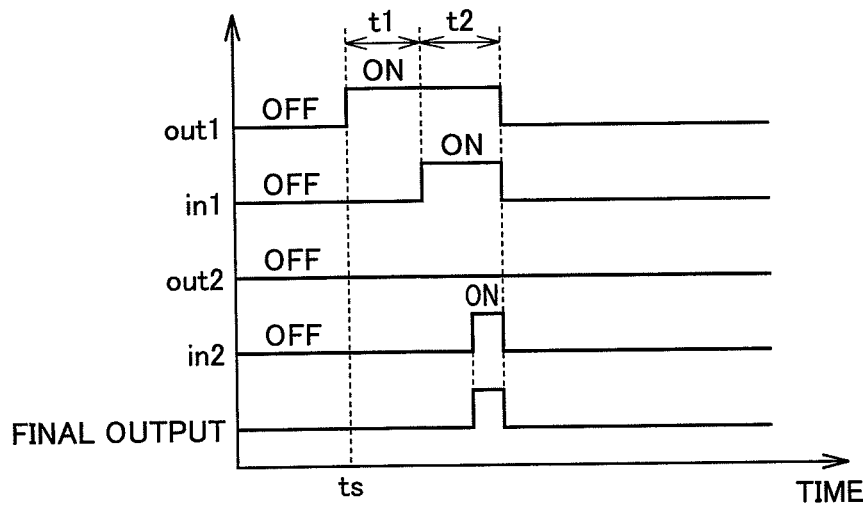
FIG. 10 is a fifth time chart for illustrating the control of the valve by the safety controller.

FIG. 10 is a fifth time chart for illustrating the control of the valve by the safety controller. FIG. 10 shows the control of valves 11 and 12 in the case where valve 12 has an open-failure. This control corresponds to the processing performed when the result of determination in step S50 shown in FIG. 5 is NO.

Referring to FIG. 10, at or before time ts, both signals in1 and in2 are off. Therefore, safety controller 20 turns on signal out1 at time ts (step S20). After time t1 elapsed since time ts, signal in1 is on. Therefore, safety controller 20 keeps the standby state for predetermined time t2.

Since valve 12 has the open-failure, both valves 11 and 12 are opened, and the fluid flows from valve 12. Sensor 14 detects the flowing of fluid from valve 12, and turns on signal in2.

Safety controller 20 detects that signal in2 is on (NO step S50). In this case, safety controller 20 turns off signal out1 (step S90), and ends the whole processing.

Signal out2 is kept off. The final output occurs only during the on period of signal out1.

Figure 11:
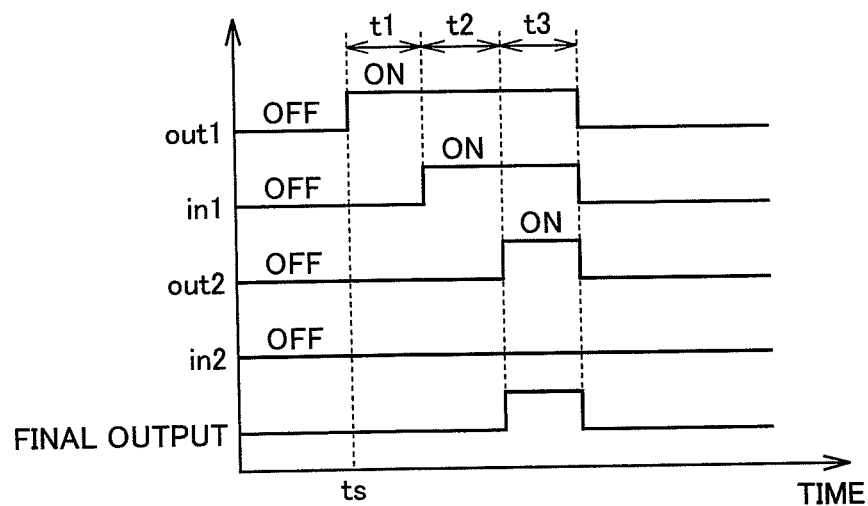
FIG. 11 is a sixth time chart for illustrating the control of the valve by the safety controller.

FIG. 11 is a sixth time chart for illustrating the control of the valve by the safety controller. FIG. 11 shows the control of valves 11 and 12 performed when sensor 14 has an off-failure. This control corresponds to the processing performed when the result of determination in step S70 shown in FIG. 5 is NO.

Referring to FIG. 11, at or before time ts, both signals in1 and in2 are off. Therefore, safety controller 20 turns on signal out1 at time ts. Signal in1 is on after time t1 elapsed since time ts. Therefore, safety controller 20 turns on signal out2 after time t2 elapsed.

Signal in2 keeps the off state in spite of the fact that a predetermined time t3 elapsed since signal out2 was turned on. When safety controller 20 detects that signal in2 is off after elapsing of predetermined time t3 (NO in step S70), safety controller 20 turns off both signals out1 and out2 (step S100), and ends the whole processing. Although the final output occurs only while both signals out1 and out2 are on, the final output will not occur after both signals out1 and out2 are turned off.

Figure 12:
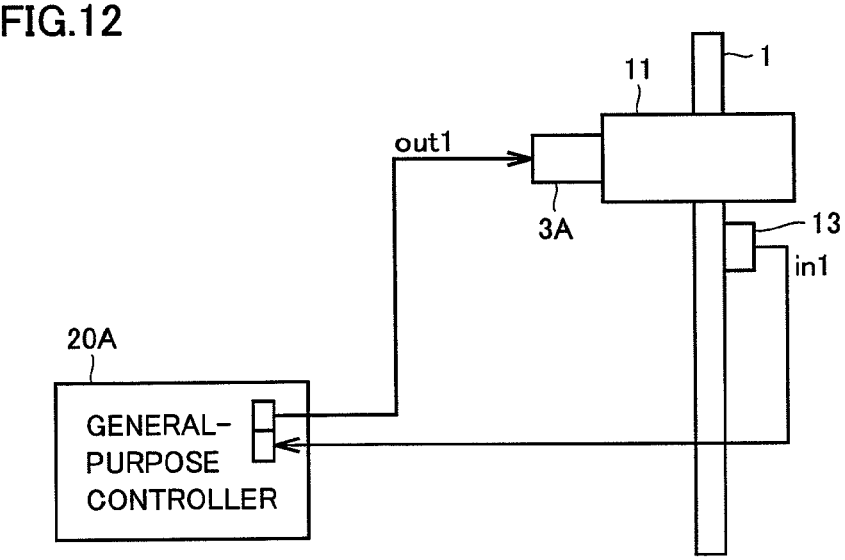
FIG. 12 shows an example of a structure of a valve control system to be compared with the valve control system according to the embodiment of the invention.
Figure 13:
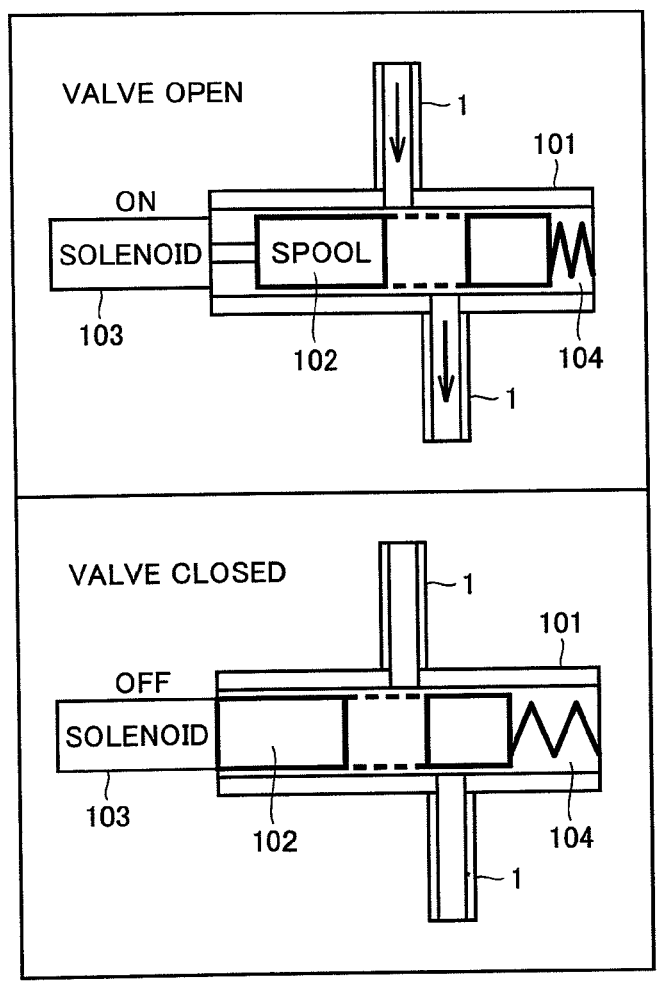
FIG. 13 illustrates an example of a conventional general-purpose valve.

FIG. 12 shows an example of the structure of the valve control system to be compared with the valve control system according to the embodiment of the invention.

Referring to FIG. 12, this system includes valve 11 (general-purpose valve), sensor 13 (general-purpose pressure switch) and a general-purpose controller 20A. FIG. 12 shows only one set of the general-purpose valve and the corresponding sensor. However, e.g., an installation of a factory employs many sets of the general-purpose valves and the sensors.

Since any one of the general-purpose valve, general-purpose sensor and general-purpose controller is not a product complying with the safety-standards, the structure shown in FIG. 12 cannot meet the safety standards. In the conventional manners, when the structure shown in FIG. 12 is to be configured to comply with the foregoing category 3 or 4 of ISO 13849-1:1999, a safety-standard-meeting valve must be arranged in pipe 1, and further such safety-standard-meeting valves must be duplexed. Moreover, the safety controller must be used as the controller for controlling the valves in place of a general-purpose controller.

However, the safety-standard meeting valve is a special part different in structure from the general-purpose valve. Therefore, when the existing system employs the safety-standard-meeting valve to configure the system complying with the safety standards, the design of the system is complicated. Further, it becomes necessary to manage the stocks of both kinds of valves, i.e., the general-purpose valves and the safety-standard-meeting valves, which complicates the stock management.

Further, the safety-standard-meeting valves are special parts so that choices or options thereof are fewer than those of the general-purpose valves. This restricts the system design. Since the safety-standard-meeting valve is generally more expensive than the general-purpose valve, the cost for constructing and maintaining the system may increase. As described before, e.g., an installation of a factory employs many sets of the general-purpose valves and sensors. Therefore, when many general-purpose valves are replaced with the safety-standard-meeting valves, this increases a possibility of remarkable increasing of the cost that is required for constructing the system complying with the safety standards.

Further, the safety-standard-meeting valve has a limit switch for directly detecting the position of the spool, and therefore is likely to be larger in size than the general-purpose valve. The installation employing the vales larger than the general-purpose valve may disadvantageously increase the scale of the installation. Thus, the safety-standard-meeting valve has large sizes so that the physical arrangement of such valves significantly restricts the design.

When the safety-standard-meeting valves are employed, the completely open state and the completely closed state can be checked by matching the stroke of the spool with the stroke of the limit switch. However, due to this structure, it is impossible to detect a state (e.g., a slightly open state) intermediate between the completely closed state and the completely open state.

Figure 18:
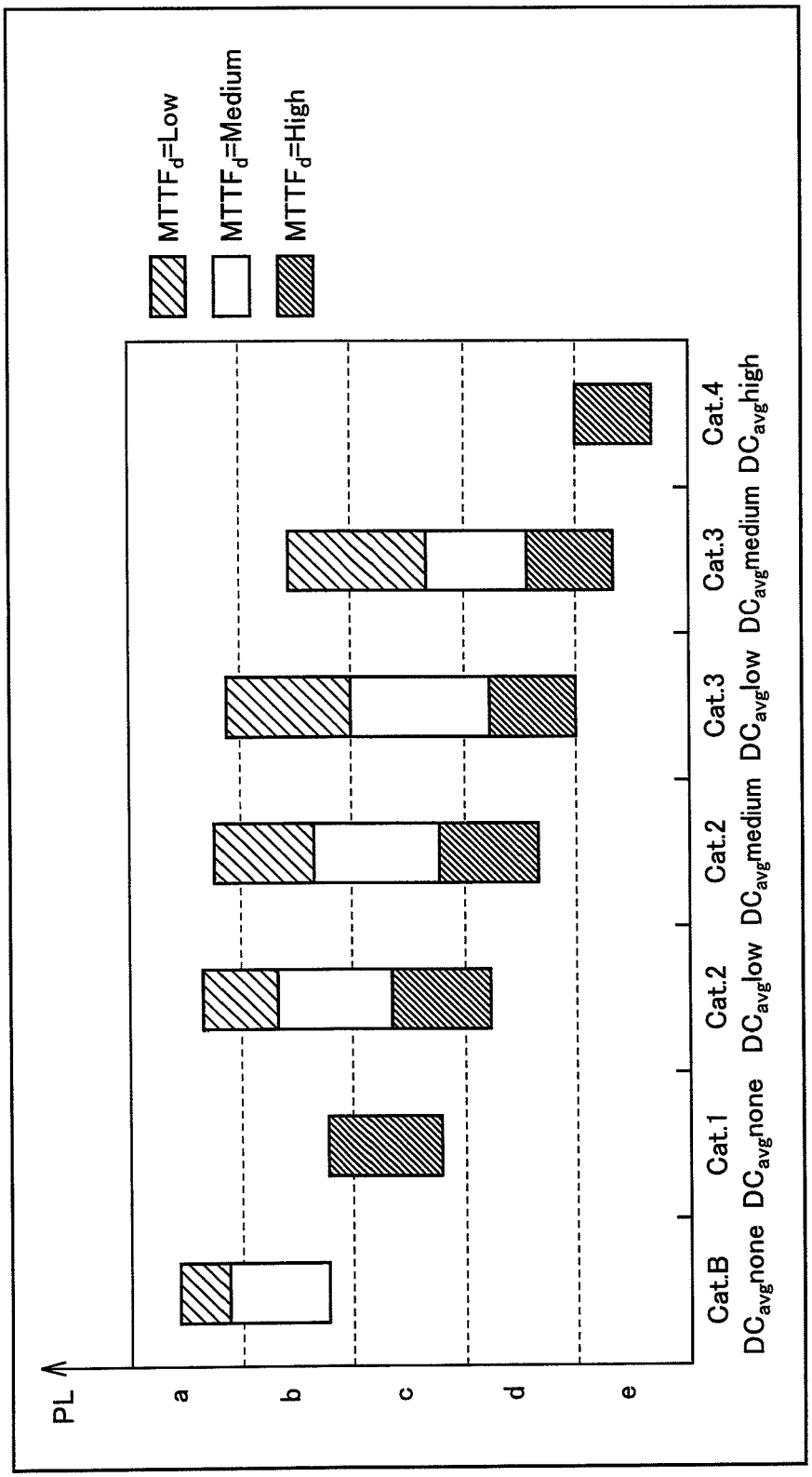
FIG. 18 is a graph for illustrating a method of evaluating a performance level.

In contrast to the above, according to the embodiment of the invention, the valve control system is formed of the general-purpose valves, general-purpose sensors and the safety controller that is configured to satisfy the safety standards (e.g., category 4 of ISO 13849-1:2006). As shown in FIG. 18, the combination of the plurality of parameters can achieve the performance level defined by ISO 13849-1:2006. According to the embodiment, therefore, the performance levels c-e of ISO 13849-1:2006 can be achieved by appropriately setting the parameters such as MTTFd and DCavg of the respective components.

According to the embodiment of the invention, the combination of the general-purpose valves and the general-purpose sensors can construct the system meeting the safety standards. Therefore, special parts such as the safety-standard-meeting valves are not required so that it is possible to avoid complication of the design of the system complying with the safety standards as well as complication of the stock management of the valves.

Further, according to the embodiment of the invention, it is not necessary to add a special valve to the existing system so that the valve suitable for the system can be selected from among various kinds of general-purpose valves.

Further, the embodiment of the invention allows easy change from the existing structure (see FIG. 12) to the structure complying with the safety-standards. Specifically, it is merely required to add one set of the general-purpose valve and the general-purpose sensor to pipe 1. Therefore, the embodiment of the invention can suppress the increase in size of the existing installation. Additionally, it is possible to increase the safety level of the already-operating installation without difficulty.

According to the embodiment of the invention, as described above, the system meeting the safety standards can be constructed without using the special valve so that the cost for constructing the system can be significantly reduced.

Further, the general-purpose sensor such as a pressure switch allows easy adjustment of a monitor value, i.e., a value for turning on the switch. Therefore, the open-close states of the valve can be checked more finely. For example, the sensor can detects a slightly open state of the valve.

The above embodiment employs the pressure switch as the switch that operates in response to the flowing of the fluid through the path. However, the switch is not restricted to the pressure switch. For example, the invention may employ a flow switch that is turned on when a flow rate of a fluid exceeds a monitor value.

The sensor is not restricted to have a configuration for detecting whether the fluid flows through the path or not, and may be configured to detect a pressure value or a flow rate. Further, the sensor may output its detected value in either the digital signal form or the analog signal form. For example, when the sensor outputs the analog signal as the signal representing the detected value, the safety controller is configured to have an analog-digital conversion function for converting the analog signal into the digital signal. According to this structure, the safety controller can detect the flowing of the fluid from the valve, by comparing the detected value with a reference value.

According to above embodiment, an electromagnetic selector valve that has only two states, i.e., open and closed states and may also be referred to as an "on-off valve" is used as the valve that is openable and closable according to the electric signal. However, the valve that is openable and closable according to the electric signal is not restricted to the above electromagnetic selector valve and, for example, may be a proportional valve of which opening can be controlled according to an input signal.

According to the embodiment, ISO 13849-1:2006 has been described as an example of the safety standards. However, the safety standards that the valve control system according to the invention can comply with are not restricted to it. The safety standards that the valve control system according to the invention can comply with are not particularly restricted, and may be the international standards, the industry standards, the national or local standards and the like. Examples of the safety standards that the invention can comply with are as follows:

1. SEMI S2 (Guideline for environment, health and safety of semiconductor manufacturing equipment)
2. CSA Z432-04 Safety of machinery
3. IEC62061 Safety machinery-functional safety of safety-related electrical, electronic and programmable electronic control systems Although the present invention has been described and illustrated in detail, it is clearly understood that the same is by way of illustration and example only and is not to be taken by way of limitation, the scope of the present invention being interpreted by the terms of the appended claims.

What is claimed is:

1. A valve control system, comprising:
   a first valve arranged in a flow path configured for a flow of fluid, said first valve being openable and closable according to a first electric signal;
   a second valve arranged in said flow path at a position downstream of said first valve, said second valve being openable and closable according to a second electric signal;
   a first sensor arranged in said flow path, and positioned between said first and second valves to detect a state of fluid flowing from said first valve;
   a second sensor arranged in said flow path, and positioned downstream from said second valve to detect a state of fluid flowing from said second valve; and
   a safety controller configured:
   to control said first and second valves based on a result of detection of said first sensor and a result of detection of said second sensor, and
   to check that the result of detection of said first sensor indicates that fluid is not flowing from said first valve and that the result of detection of said second sensor indicates that fluid is not flowing from said second valve.

2. The valve control system according to claim 1, wherein said safety controller is configured:
   to execute a first control to open said first valve after the result of detection of said first sensor and the result of detection of said second sensor are checked,
   to check that the flow of fluid from said first valve is indicated by the result of detection of said first sensor performed after a first period elapsed since execution of said first control,
   to execute a second control to open said second valve in response to changing of the result of detection of said first sensor,
   to check that the flow of fluid from said second valve is indicated by the result of detection of said second sensor performed after a second period elapsed since execution of said second control, and
   to keep said first and second valves in an open state.

3. The valve control system according to claim 2, wherein said first control is configured to be executed at an initial time, and wherein
   said safety controller is configured to end the control of said first and second valves without executing said first and second control when the result of detection of said first sensor indicates that fluid is flowing from said first valve before said initial time elapses.

4. The valve control system according to claim 2, wherein said first control is configured to be executed at an initial time and said second control is configured to be executed at a later time, and wherein
   said safety controller is configured to end the control of said first and second valves without executing said first and second control, when the result of detection of said second sensor indicates that fluid is flowing from said second valve before said initial time and said later time elapse.

5. The valve control system according to claim 2, wherein said first control is configured to be executed at an initial time, and wherein
   said safety controller is configured to end the control of said first and second valves by controlling said first valve to close and not executing said second control when the result of detection of said first sensor does not change after elapsing of said first period which occurs subsequent to said initial time elapsing.

6. The valve control system according to claim 2, wherein said first control is configured to be executed at an initial time and said second control is configured to be executed at a later time, and wherein
   said safety controller is configured to end the control of said first and second valves by controlling said first valve to close, when the result of detection of said second sensor indicates that fluid is flowing from said second valve in a stage where said first control is executed and said second control is not executed.

7. The valve control system according to claim 2, wherein said first control is configured to be executed at an initial time and said second control is configured to be executed at a later time, and wherein
   said safety controller is configured to end the control of said first and second valves by controlling said first and second valves to close, when the result of detection of said second sensor does not change after elapsing of said second period which occurs subsequent to said later time elapsing.

8. A valve control method for execution by a valve control system,
   said valve control system including:
   a first valve arranged in a flow path configured for a flow of fluid, said first valve being openable and closable according to a first electric signal,
   a second valve arranged in said flow path at a position downstream of said first valve, and said second valve being openable and closable according to a second electric signal,
   a first sensor arranged in said flow path, and positioned between said first and second valves to detect a state of ffluid flowing from said first valve, a second sensor arranged in said flow path, and positioned downstream from said second valve to detect a state of fluid flowing from said second valve, and a safety controller configured to control said first and second valves based on a result of detection of said first sensor and a result of detection of said second sensor; and said valve control method comprising:

checking that the result of detection of said first sensor indicates that said fluid is not flowing from said first valve and that the result of detection of said second sensor indicates that said fluid is not flowing from said second valve;

executing a first control to open said first valve after the result of detection of said first sensor and the result of detection of said second sensor are checked;

checking that the flowing of said fluid from said first valve is indicated by the result of detection of said first sensor performed after a first period elapsed since execution of said first control;

executing a second control to open said second valve in response to changing of the result of detection of said first sensor; and checking that the flowing of said fluid from said second valve is indicated by the result of detection of said second sensor performed after a second period elapsed since execution of said second control.

9. The valve control method according to claim 8, further comprising:

providing said first control to be executable at an initial time, and keeping said second valve in a closed state when the result of detection of said first sensor indicates that fluid is flowing from said first valve before said initial time elapses.

10. The valve control method according to claim 8, further comprising:

providing said first control to be executable at an initial time and said second control to be executable at a later time, and controlling said first valve to close when the result of detection of said second sensor indicates that fluid is flowing from said second valve before said initial time and said later time elapse.

11. The valve control method according to claim 8, further comprising:

providing said first control to be executable at an initial time and controlling said first valve to close when the result of detection of said first sensor does not change after elapsing of said first period which occurs subsequent to said initial time elapsing.

12. The valve control method according to claim 8, further comprising:

providing said first control to be executable at an initial time and said second control to be executable at a later time, and controlling said first valve to close when the result of detection of said second sensor indicates that fluid is flowing from said second valve in a stage where said first control is executed and said second control is not executed.

13. The valve control method according to claim 8, further comprising:

providing said first control to be executable at an initial time and said second control to be executable at a later time, and controlling said first and second valves to close when the result of detection of said second sensor does not change after elapsing of said second period which occurs subsequent to said later time elapsing.

* * * * *

UNITED STATES PATENT AND TRADEMARK OFFICE
CERTIFICATE OF CORRECTION

PATENT NO. : 8,640,724 B2  
APPLICATION NO. : 13/022222  
DATED : February 4, 2014  
INVENTOR(S) : H. Izutani et al.

Page 1 of 1

It is certified that error appears in the above-identified patent and that said Letters Patent is hereby corrected as shown below:

In the Claims

Column 14, line 67 (claim 8), replace the term "ffluid" with the term --fluid--.

Signed and Sealed this  
Seventh Day of October, 2014

Michelle K. Lee  
*Deputy Director of the United States Patent and Trademark Office*